US007853451B1

(12) United States Patent
Gupta et al.

(10) Patent No.: US 7,853,451 B1
(45) Date of Patent: Dec. 14, 2010

(54) SYSTEM AND METHOD OF EXPLOITING HUMAN-HUMAN DATA FOR SPOKEN LANGUAGE UNDERSTANDING SYSTEMS

(75) Inventors: Narendra K. Gupta, Dayton, NJ (US); Gokhan Tur, Morris Plains, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 1329 days.

(21) Appl. No.: 10/739,380

(22) Filed: Dec. 18, 2003

(51) Int. Cl.
| | |
|---|---|
| G06F 17/27 | (2006.01) |
| G06F 17/21 | (2006.01) |
| G10L 15/28 | (2006.01) |
| G10L 15/18 | (2006.01) |
| G10L 21/00 | (2006.01) |
| H04M 1/64 | (2006.01) |
| H04M 11/00 | (2006.01) |

(52) U.S. Cl. .............................. 704/257; 704/9; 704/10; 704/255; 704/270; 704/275; 379/88.01; 379/88.14

(58) Field of Classification Search ..................... 704/9, 704/10, 255, 257, 270, 275; 379/88.01, 88.04
See application file for complete search history.

(56) References Cited

U.S. PATENT DOCUMENTS

| | | | | | |
|---|---|---|---|---|---|
| 4,882,759 | A  | * | 11/1989 | Bahl et al. ................... | 704/243 |
| 6,199,043 | B1 | * | 3/2001  | Happ ........................... | 704/272 |
| 6,236,966 | B1 | * | 5/2001  | Fleming ....................... | 704/259 |
| 6,295,529 | B1 | * | 9/2001  | Corston-Oliver et al. ........ | 707/3 |
| 6,631,346 | B1 | * | 10/2003 | Karaorman et al. ............. | 704/9 |
| 6,820,055 | B2 | * | 11/2004 | Saindon et al. ............... | 704/235 |
| 6,839,671 | B2 | * | 1/2005  | Attwater et al. .............. | 704/255 |
| 6,898,277 | B1 | * | 5/2005  | Meteer et al. .......... | 379/265.02 |
| 6,941,266 | B1 | * | 9/2005  | Gorin et al. .................. | 704/257 |
| 6,983,247 | B2 | * | 1/2006  | Ringger et al. ............... | 704/251 |
| 7,280,965 | B1 | * | 10/2007 | Begeja et al. ................ | 704/257 |
| 7,292,976 | B1 | * | 11/2007 | Hakkani-Tur et al. ........ | 704/236 |
| 2002/0176002 | A1 | * | 11/2002 | Kawada et al. .............. | 348/192 |
| 2003/0105634 | A1 | * | 6/2003  | Abella et al. ................. | 704/257 |
| 2003/0212543 | A1 | * | 11/2003 | Epstein et al. ................. | 704/9 |
| 2003/0212544 | A1 | * | 11/2003 | Acero et al. ................... | 704/9 |
| 2004/0186721 | A1 | * | 9/2004  | Beynon et al. .............. | 704/270 |

FOREIGN PATENT DOCUMENTS

WO      WO 0209094  A1  *  1/2002

OTHER PUBLICATIONS

Gupta et al., "Extracting Clauses for Spoken Language Understanding in Conversational Systems", Procs EMNLP, Philadelphia, Jul. 2002, pp. 273-280.*

(Continued)

*Primary Examiner*—James S Wozniak
*Assistant Examiner*—Paras Shah

(57) ABSTRACT

A method is disclosed for generating labeled utterances from human-human utterances for use in training a semantic classification model for a spoken dialog system. The method comprises augmenting received human-human utterances with data that relates to call-type gaps in the human-human utterances, augmenting the received human-human utterances by placing at least one word in the human-human utterances that improves the training ability of the utterances according to the conversation patterns of the spoken dialog system, clausifying the human-human utterances, labeling the clausified and augmented human-human utterances and building the semantic classification model for the spoken dialog system using the labeled utterances.

10 Claims, 2 Drawing Sheets

OTHER PUBLICATIONS

Gupta et al., "Segmenting Spoken Language Utterances Into Clauses for Semantic Classification", Automatic Speech Recognition and Understanding, Nov. 30-Dec. 3, 2003, pp. 525-530.*

Allen, et al. Draft of DAMSL: Dialog Act Markup in Several Layers. Oct. 18, 1997. pp. 1-32.http://www.cs.rochester.edu/research/speech/damsl/RevisedManual.*

A. Stolcke, K. Ries, N. Coccaro, E. Shriberg, R. Bates, D. Jurafsky, P. Taylor, R. Martin, C. Van Ess-Dykema, and M. Meteer, Dialogue Act Modeling for Automatic Tagging and Recognition of Conversational Speech, Computational Linguistics 26(3), 339-373, 2000. http://citeseer.ist.psu.edu/stolcke00dialogue.html.*

Prasad, R. and Walker, M. 2002. Training a Dialogue Act Tagger for human-human and human-computer travel dialogues. In Proceedings of the 3rd Sigdial Workshop on Discourse and Dialogue—vol. 2 (Philadelphia, Pennsylvania, Jul. 11-12, 2002). Annual Meeting of the ACL. Association for Computational Linguistics, Morristown, NJ, 162-173.*

L. Devillers, I. Vasilescu, L. Lamel, "Annotation and Detection of Emotion in a Task-oriented Human-Human Dialog Corpus", ISLE Workshop on dialogue tagging, Edinburgh, Dec. 2002. http://citeseer.ist.psu.edu/devillers02annotation.html.*

Rosset, S Tribout, D., and Lamel, L. 2008. Multi-level information and automatic dialog act detection in human-human spoken dialogs. Speech Commun. 50, (Jan. 1, 2008), 1-13. DOI= http://dx.doi.org/10.1016/j.specom.2007.05.007.*

Gavald. "Interactive Grammar Repair." in Proceedings of the Workshop on Automated Acquisition of Syntax and Parsing of the 10th European Summer School in Logic, Languageand Information (ESSLLI-1998), Saarbricken, German, Aug. 1998.*

C. de Loupy, M. El-Beze, P.F. Marteau, Using Semantic Classification Trees for WSD, 2000.

Mingwen Wang, Jian-Yun Nie, A Latent Semantic Structure Model for Text Classification, 2003.

Stephen Patel, Joseph Smarr, Automatic Classification of Previously Unseen Proper Noun Phrases into Semantic Categories Using an N-Gram Letter Model, 2001.

* cited by examiner

SYSTEM AND METHOD OF EXPLOITING HUMAN-HUMAN DATA FOR SPOKEN LANGUAGE UNDERSTANDING SYSTEMS

RELATED APPLICATIONS

The present application is related to U.S. patent application Ser. No. 10/329,138 filed Dec. 24, 2002, and U.S. patent application Ser. No. 10/446,489 filed May 28, 2003. The contents of each of these patent applications are incorporated herein by reference.

BACKGROUND OF THE INVENTION

1. Field of the Invention

The present invention relates to spoken dialog systems and more specifically to a system and method of using human-human labeled utterance data for training spoken language understanding systems.

2. Introduction

Spoken dialog systems require various components or modules to intelligently receive human speech, understand the speech and intent of the speaker, generate an appropriate response text, and synthesize an audible response. The natural language understanding (NLU) module within the spoken dialog system receives the text from an automatic speech recognition module and determines the intent or the understanding of the utterance. At the heart of the NLU is a semantic classifier. This semantic classifier is trained off-line to make such a determination using labeled utterances. Training utterances may be obtained from several different sources. For example, a company that is developing an NLU system may have recordings of communications between its call center and customers. If the call center is staffed by humans, then these would be human-human utterances. Human-machine dialog typically refer to dialogs between a computer system and a human, such as a customer talking to an automated dialog system.

Before the deployment of a new NLU system, human-machine dialogs necessary for training a semantic classifier may not be available. On the other hand, human-human utterances are much more commonly available since companies typically already have such recordings and they do not cost nearly as much to obtain. Since the human-human dialogs do not represent the actual human-machine dialogs, training the semantic classifier using human-human utterances directly does not give a good model for human-machine interaction. The call-type distribution, length, perplexity and some other characteristics of human-human utterances are very different than human-machine utterances. For example, some very frequent call types are missing (like requesting a customer service representative). Human-human utterances are on average three times longer than human-machine utterances and include multiple sentences and sentential clauses. The classifier performance is generally worse on utterances meant for human interaction. Long incoherent utterances, that typically contain more than one semantic class, confuse the learning algorithm, because they contain many features. Most of these features are totally useless for the task at hand. Therefore the classifier not only must learn what the important features are, it must also learn which features are associated with which class. As can be appreciated, when training a semantic classification model for an NLU module, human-human interactions, which are generally available, are not always helpful. However, training the NLU module is costly and requires experts to perform the task because of the lack of usable training data. Accordingly, what is needed in the art is a more efficient way to train NLU systems using existing utterances.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention relates to a method of exploiting human-human utterances for training a semantic classification model for use in a natural language understanding module for a spoken dialog system. The method comprises augmenting the human-human utterances with call-types that are missing or infrequent, augmenting some human-human utterances with at least one word to reflect human-machine dialog characteristics, clausifying the utterances, labeling the clauses and building the semantic classification model.

Another embodiment of the invention comprises a spoken dialog system generated by practicing the steps of the invention set forth herein. Yet another embodiment of the invention comprises a natural language understanding module generated according to the method set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
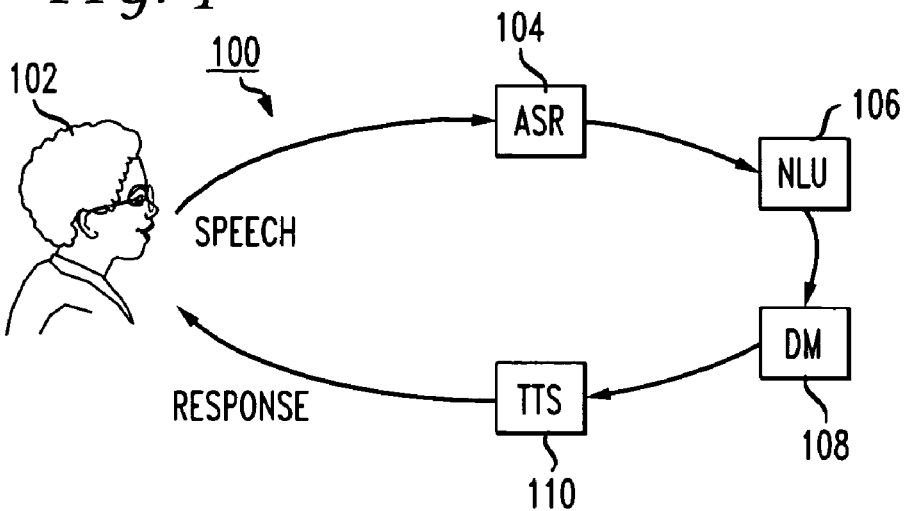
FIG. 1 represents a basic spoken dialog system.

The present invention provides for a method and system for exploiting human-human utterances for training spoken language understanding systems. FIG. 1 provides the basic modules that are used in a spoken dialog system 100. A user 102 that is interacting with the system will speak a question or statement. An automatic speech recognition (ASR) module 104 will receive and process the sound from the speech. The speech is recognized and converted into text. The text is transmitted to a natural language understanding (NLU) module 106 that determines the intent or purpose of the speech. A dialog management (DM) module 108 processes the received intent or purpose of the user's speech and generates an appropriate response. Typically, the response is generated in text which is transmitted to a text-to-speech module 110 that synthesizes audible speech that the user 102 receives and hears. The present invention relates to the training process to generate the NLU module 106.

The basic operation of the spoken dialog system 100 may be on a single server or in a client/server environment. It is immaterial to the present invention whether all the modules are processed on a single server, numerous servers, or on various nodes within a network like the world-wide-web or a wireless network. For example, it is immaterial whether the user speaks into a client device like a cell phone or portable PDA (not shown) which runs the ASR module 104 and transmits text over a wireless connection to a server that runs the other modules.

Directly using the human-human utterance for training human-human data does not result in good semantic classification models because there are differences in the language patterns between human-computer and human-human conversations. The present invention seeks to process the human-human data such that it reflects the characteristics of human-machine interactions before using it for training the semantic classification model.

As part of the NLU module, a semantic classification model is a statistical model that analyzes the received text and seeks to identify the meaning or intent of the text. There are many different types of classification models and no particular model is preferable when practicing the present invention.

One issue with human-human interactions is that some call types are missing. The context of a user contacting a call center of a company, such as a bank or a transportation reservation company, will be used in this description. It will be understood that there is no specific context for the present invention. When a user calls a call center, the user talks with humans. The language patterns in these conversations differ from human-computer interactions in various ways. For example, when talking with a human, the user would not request to talk with a customer representative. Also, unlike humans, a machine dialog system confirms most of its understanding before acting on it. There are significant utterances in human-machine dialogs that simply confirm/deny system understanding. For example, if the user is talking with a bank's computer spoken dialog system, and the user asks "I need my account balance." The spoken dialog system may identify a call type as account_balance_request. To confirm the call type, the spoken dialog service may request a confirmation: "You are asking for your account balance. Is this correct?" The customer may respond by a simple "Yes" or "No." Some customer may however choose to elaborate and say "No I am not asking about my balance. I am asking about a specific withdrawal." Notice in such utterances the customer besides disconfirming the understanding has restated what they want. Because human operators have better understanding abilities, such an exchange would be infrequent in human-human interaction. However, when training an NLU module, such interactions are needed in the training data.

Figure 2:
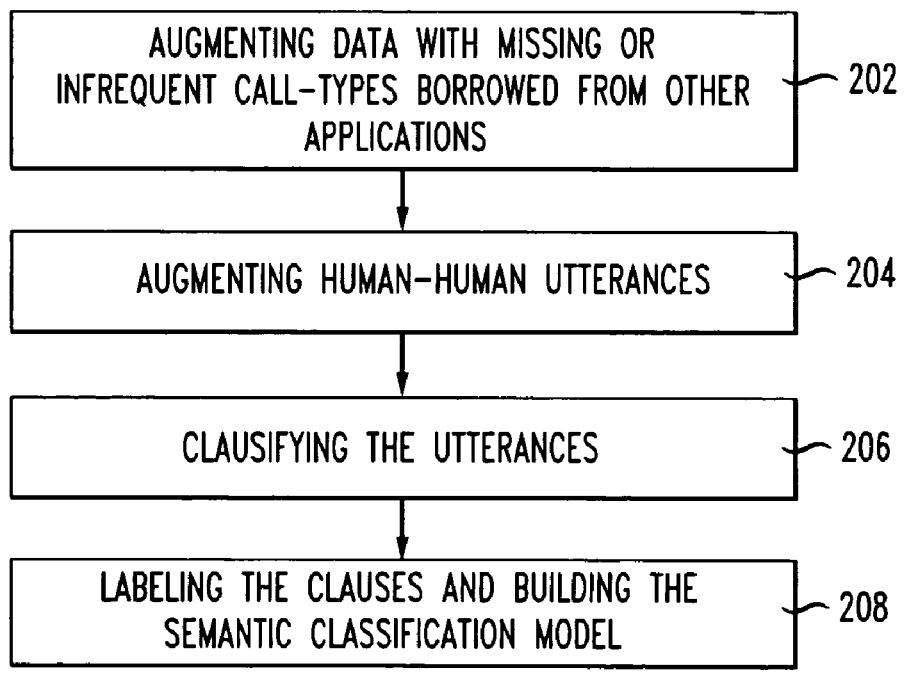
FIG. 2 illustrates a method according to first embodiment of the present invention.

To accommodate this deficiency in human-human interaction, a first embodiment of the invention, shown in FIG. 2, involves augmenting the data with the missing or infrequent call types (202). The call types used to augment the data may be borrowed from other applications or separately developed.

The process next involves augmenting the utterances themselves (204). The purpose of this is to produce some data for the elaborated confirmation/denial some customer may provide. Such utterances are composed of "No" plus some intent, such as "No I do not want the checking account balance I want the savings account balance". According to this invention, this is accomplished for example by placing the word "no" in front of some selected utterances. Other words may also be inserted into other utterances according to the particular needs of the current application being developed. In this regard, some or all of the basic additional interactions that take place between a computer and a human that are not present in human-human interaction may be analyzed and all or parts of the computer-human interactions may be inserted into the human-human utterance data. This step improves the training data for the training of a semantic classification model.

In most human-machine dialogs people are co-operative and speak in short and simple sentences. This differs from human-human dialogs where people try to explain every detail of their request in the same utterance. To process the human-human utterances so that it is suitable for training the semantic classifier for human-machine dialogs, another step in the process involves clausification of the utterances (206). In this process, the transcription of user utterance is first broken up into clauses, and instead of labeling the raw transcriptions, these clauses are labeled and used for building the semantic classification model (208).

The patent applications incorporated above provide further details regarding clausification of utterances. Clausification removes most of the noise injected in the data because of the variability in individual speaking styles. It breaks down the input into small semantically self contained clauses that can be labeled with ease and without many errors. Clausification also has a data multiplication effect. Because of these reasons, use of clausification enables development of better semantic classification models. Since clausifiers are general purpose tools they can be used across applications.

A clausifier may be comprised of several components: a sentence boundary classifier detects sentence boundaries within a speech utterance text, an editing classifier edits the speech utterance text to remove unneeded words and a conjunction classifier detects conjunctions within the speech utterance text. The clausifer outputs annotated text having identifiable clauses according to the sentence boundaries, edited text, and conjunctions within the speech utterance text. In the context of the present invention, the clausifier may clausify the text before or after the augmentation steps.

Figure 3:
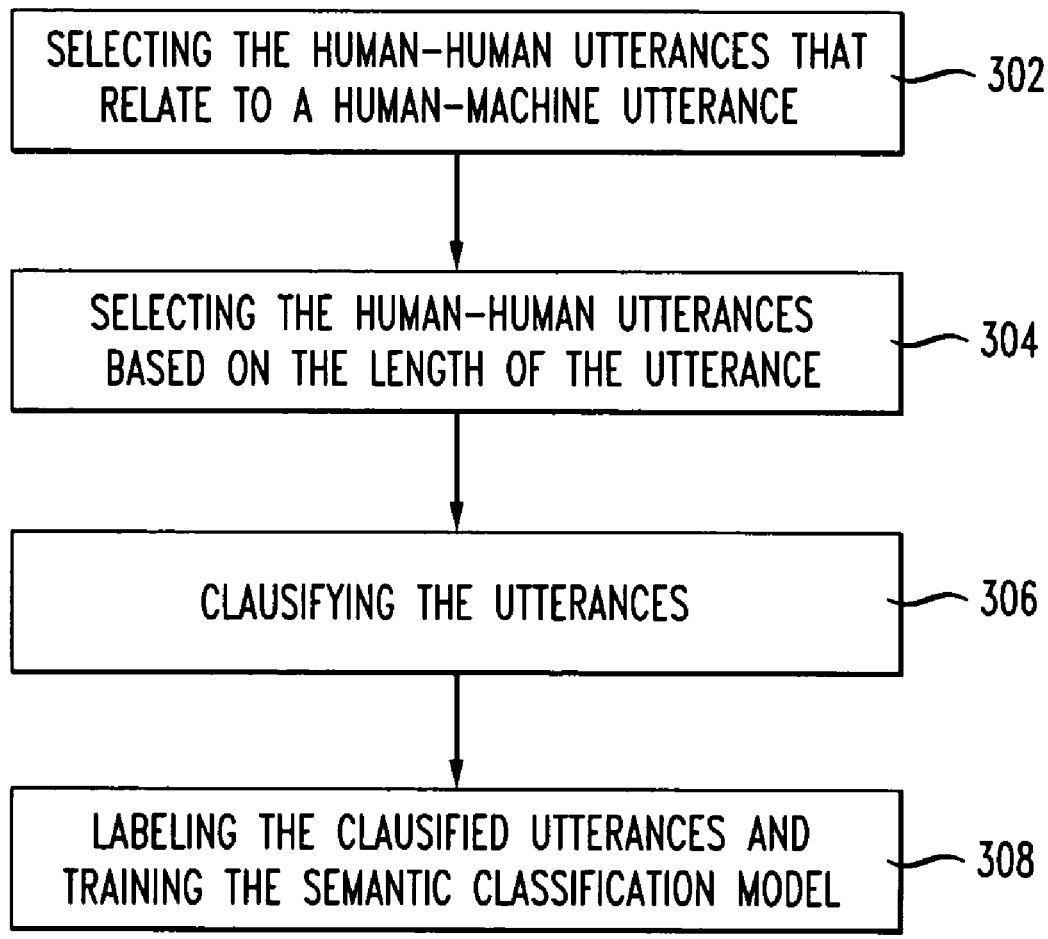
FIG. 3 illustrates a method according to a second embodiment of the invention.

The second embodiment of the invention is shown in FIG. 3. This embodiment uses selective sampling to improve the human-human utterances for training an NLU system. This method comprises selecting the human-human utterances which look like human-machine utterances and ignoring the rest of the utterances (302). This idea assumes a large amount of human-human data, which generally is the case. Making the appropriate selection of human-human utterance data that resembles human-computer interaction, better models may be developed when little or no human-machine data is available.

In one aspect of the second embodiment of the invention, the length of the utterance may be used as a factor when considered whether to select the utterance for training (304). Longer utterances are not as productive or useful. The length may be determined by the number of words or the length in time or some other parameter. Therefore, this step involves ignoring utterances in a human-human utterance database that are longer than X number of words or longer than Y number of seconds. Even though the model may be trained using about half the data, performance improves. This approach may be used in conjunction with clausification (306). Finally, the utterances that are selected are labeled and used to train the semantic classification model (308).

The process of deciding which human-human utterances to select may involve many more factors. For example, instead of being based on utterance length, the process may be termed a classification issue. In this case, utterance length may be one of the parameters evaluated to determine whether to select a particular utterance. Other parameters may include, for example, a number of clauses selected or available, ASR confidence and NLU confidence.

Another variation of the invention comprises training a semantic classifier (e.g., a decision tree) using existing human-machine data and applying it to the human-human data.

Embodiments within the scope of the present invention may also include computer-readable media for carrying or having computer-executable instructions or data structures stored thereon. The above steps naturally involve human involvement but the same steps and processing of human-human data could occur via a computer program that performs the same analysis and steps. Therefore, the augmentation steps, clausification, and labeling steps to prepare the training data for a semantic classification model may be practiced by a computer. Furthermore, another embodiment of the invention is a spoken dialog service and spoken dialog system generated according to the steps set forth herein to more efficiently develop the training data for the NLU module.

Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method for generating labeled utterances from human-human utterances for use in training a semantic classification model for a spoken dialog system, the method comprising:
   identifying via a processor call-type gaps in human-human utterances to yield identified call-type gaps, wherein the identified call-type gaps include one of a missing call-type and an infrequent call-type;
   augmenting the human-human utterances with data that relates to the identified call-type gaps in the human-human utterances;
   augmenting the human-human utterances, to yield augmented human-human utterances by placing at least one word within the text of the human-human utterances that improves a training ability of the human-human utterances according to conversation patterns of the spoken dialog system;
   clausifying the augmented human-human utterances to yield clausified, augmented human-human utterances;
   labeling the clausified, augmented human-human utterances to yield labeled utterances; and
   building a semantic classification model for the spoken dialog system using the labeled utterances.

2. The method of claim 1, wherein clausifying the received human-human utterances occurs before the augmenting steps.

3. The method of claim 1, wherein clausifying the received human-human utterances further comprises:
   detecting sentence boundaries within a speech utterance text;
   editing the speech utterance text to remove unneeded words; and
   detecting conjunctions within the speech utterance text, wherein the clausifer outputs annotated text having identifiable clauses according to the sentence boundaries, edited text, and conjunctions within the speech utterance text.

4. The method of claim 1, wherein the data that relates to call-type gaps used to augment the received human-human utterances is borrowed from other spoken dialog system applications.

5. The method of claim 4, wherein the other spoken dialog system applications have a related function to the spoken dialog system.

6. The method of claim 1, wherein only a portion of the clausified human-human utterances are labeled and used to build the semantic classification model.

7. The method of claim 6, wherein the portion of the clausified human-human utterances that are labeled and used to build the semantic classification model relate to identifying the intent of the speaker.

8. The method of claim 1, wherein the at least one word is either no or yes.

9. The method of claim 1, wherein the at least one word relates to a phrase related to a computer-human interaction.

10. The method of claim 1, wherein missing or infrequent call-types include call types which are missing or infrequent in the human-human utterances, but would be more common in human-machine dialogs.

* * * * *